United States Patent [19]

Coplien et al.

[11] Patent Number: 5,093,914
[45] Date of Patent: Mar. 3, 1992

[54] METHOD OF CONTROLLING THE EXECUTION OF OBJECT-ORIENTED PROGRAMS

[75] Inventors: James O. Coplien, Wheaton; Thomas V. Williams, Naperville, both of Ill.

[73] Assignee: AT&T Bell Laboratories, Murray Hill, N.J.

[21] Appl. No.: 451,390

[22] Filed: Dec. 15, 1989

[51] Int. Cl.$^5$ .............................................. G06F 11/00
[52] U.S. Cl. ................................... 395/700; 364/275.5
[58] Field of Search ...................... 364/200, 275.5, 900; 371/19, 12, 13

[56] References Cited

U.S. PATENT DOCUMENTS

| | | | |
|---|---|---|---|
| 4,080,650 | 3/1978 | Beckett | 364/200 |
| 4,791,550 | 12/1988 | Stevenson et al. | 364/200 |
| 4,885,717 | 12/1989 | Beck et al. | 364/900 |

OTHER PUBLICATIONS

T. A. Cargill, "Pi: A Case Study in Object-Oriented Programming", OOPSLA '86 Proceedings, Sep. 1986, pp. 350-360.
G. A. Pascoe, "Elements of Object-Oriented Programming", Byte, Aug. 1986.
G. Booch, "Object-Oriented Development", *IEEE Transactions on Software Engineering*, vol. SE-12, No. 1, Feb. 1986, pp 211-221.
J. R. Pugh, "Actors Set the Stage for Software Advances", *Computer Design*, Sep. 1984, pp. 185-186 and 188-189.
B. Stroustrup, "An Overview of C++", *SIGPLAN Notices*, V21, #10, Oct. 1986, pp. 7-18.
Tooke, Simon, "Object-Oriented Debugging: Strategies and Tools for Debugging Your Oop Apps.", *Dr. Dobbs Journal*, Nov. 1990, p. 36.
Sun C++ Programmer's Guide—Sun Microsystems.
S. B. Lippman et al., "Pointers to Class Members in C++", *Proceedings of the USENIX C++ Conference*, Denver, Colo., Oct. 17-21, 1988, pp. 305-326.

*Primary Examiner*—Michael R. Fleming
*Assistant Examiner*—Glenn A. Auve
*Attorney, Agent, or Firm*—Ross T. Watland

[57] ABSTRACT

A method used by a digital computer in controlling execution of an object-oriented program to effect a defined action, e.g., stopping the program, when a specified virtual function is invoked on a specified object during execution of the program. A breakpoint address is determined at run time, advantageously after the specified object is created in accordance with execution of the program. The breakpoint address determination is not based solely on symbol table, pre-execution, information, but in addition on information generated in conjunction with the creation of the specified object. The breakpoint is inserted while program execution is stopped at an intermediate program point after the specified object is created. After program execution is resumed and the specified virtual function is invoked in accordance with the program, the breakpoint fires. However, the defined action is performed only in response to determining that the firing occurred on the specified object.

21 Claims, 11 Drawing Sheets

EXECUTABLE PROGRAM IMAGE

PI

ST

```
10110101001001001000100100100010101111001000100 10
10010010010111010100100100101001001001110110100 00
                                                 11
                                                 10
                                                 10
                                                 01
                                                 01
                                                 11
                                                 00
                                                 00
                                                 00
                                                 10
                                                 01
                                                 11
                                                 10
                                                 10
                                                 10
                                                 01
                                                 11
```

SYMBOL TABLE

| #  | NAME       | TYPE         | CLASS    | ADDRESS  | #LINK |
|----|------------|--------------|----------|----------|-------|
| 1  | o2         | *struct-Object | local  | 0xaff0   |       |
| 2  | struct-Object | struct    | struct   | size=0x14 |      |
| 3  | foo        | long         | member   | 0x0      | 2     |
| 4  | bar        | long         | member   | 0x4      | 2     |
| 5  | _vptr      | **__mptr     | member   | 0x10     | 2     |
| 6  | struct-A   | struct       | struct   | size=0x1c |      |
| 7  | foo        | long         | member   | 0x0      | 6     |
| 8  | bar        | long         | member   | 0x4      | 6     |
| 9  | _vptr      | **__mptr     | member   | 0x10     | 6     |
| 10 | aData      | float        | member   | 0x14     | 6     |
| 11 | struct-B   | struct       | struct   | size=0x18 |      |
| 12 | foo        | long         | member   | 0x0      | 11    |
| 13 | bar        | long         | member   | 0x4      | 11    |
| 14 | _vptr      | **__mptr     | member   | 0x10     | 11    |
| 15 | bData      | short        | member   | 0x14     | 11    |
| 16 | _f__1AFv   | short        | function | 0xa130   |       |
| 17 | __0this    | *struct-A    | arg      | 0x8      | 16    |
| 18 | _main      | int          | function | 0x1a0    |       |

DISK 200

FIG. 3

ACTORS STYLE BREAKPOINTS FOR NON-VIRTUAL FUNCTIONS

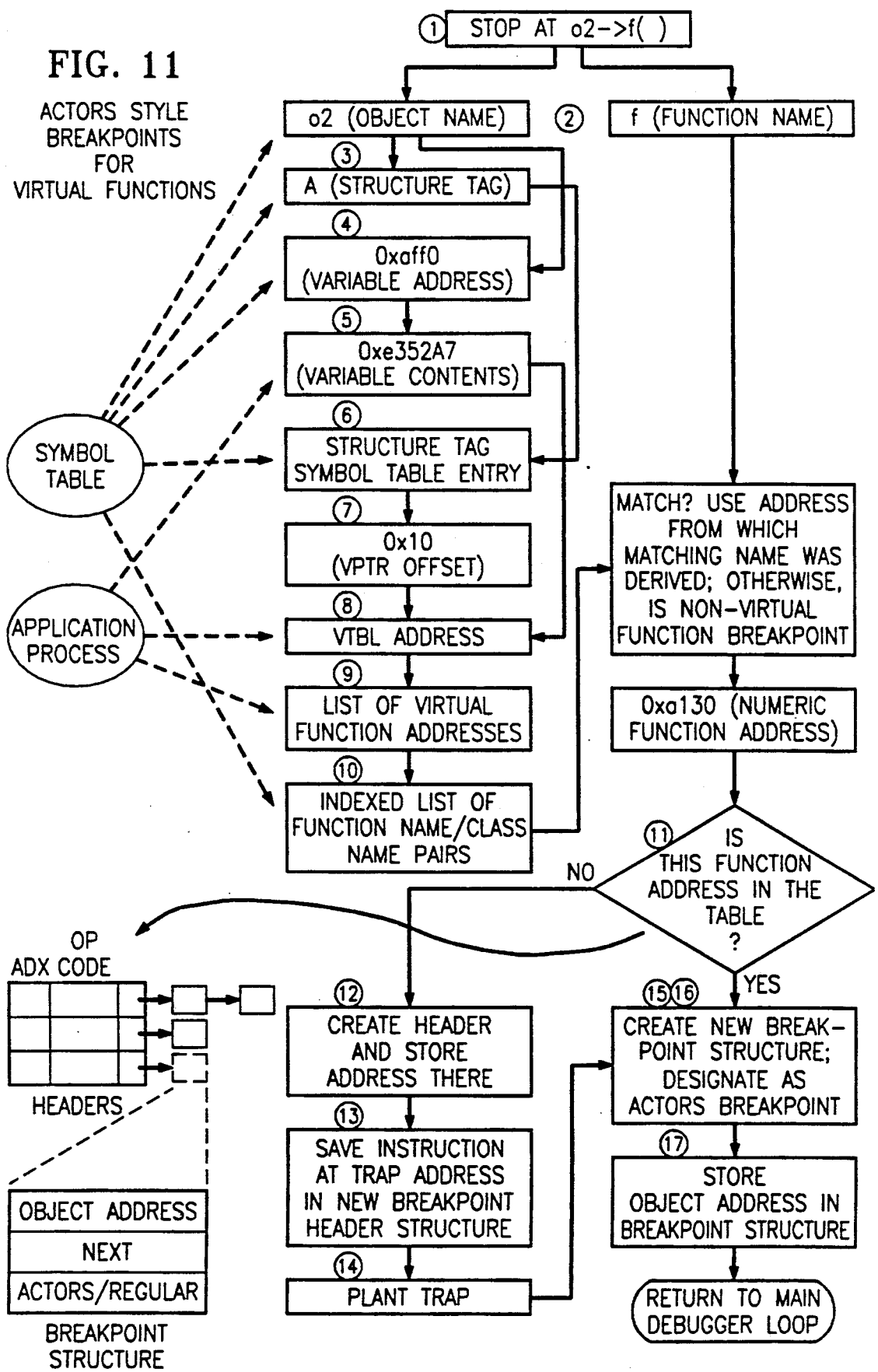
FIG. 11 ACTORS STYLE BREAKPOINTS FOR VIRTUAL FUNCTIONS

METHOD OF CONTROLLING THE EXECUTION OF OBJECT-ORIENTED PROGRAMS

TECHNICAL FIELD

This invention relates to computing.

BACKGROUND AND PROBLEM

A debugger is a tool that aids software development by giving a user control over and access to a running program. Debuggers typically run as self-contained processes, controlling the program under study—the so-called application process—through operating system primitives designed for that purpose. A simple application program typically consists of data, and functions that operate on those data. Data and functions are defined in a source file created by the programmer. Each datum is associated with a type that describes its internal structure and behaviors; for example, integers may be 16 bits long, and may be added, subtracted, multiplied, etc. A tool called a compiler or translator reads a source file and produces an object file. The compiler typically works in conjunction with other tools-assemblers, linkers, and optimizers-to accomplish this task, and such ancillary tools are usually invisible to the programmer.

The object file contains bits which can be loaded into computer memory and executed; these bits include both the data and the machine instructions generated from the original program. These bits, when loaded into memory, are called the program image. In most systems, there is a close mapping of program image onto what the user perceives as a user process. The object file also contains a table that maps some of the original source information, as variable and function names, onto addresses, offsets, sizes, and other pertinent properties of the program image. This so-called symbol table is usually not made part of the program image itself, but remains in the object file where other programs (like the debugger) can read and analyze it.

A debugger is used to examine the program image of a program in execution, and to control the execution of the program. Because the debugger has access to the symbol table, it allows the user to interact with the target process in terms of the names found in the source code. For example, if the user knows the name of a variable, they can ask the debugger to retrieve that variable's current contents from the program image or from storage dynamically allocated at run time by giving the variable's name. By going to the symbol table and looking up the variable's address and type, the debugger obtains the information it needs to satisfy the user request. An analogous scenario might allow the user to modify the value of a variable's contents on the fly. These are usually done while the target program is stopped.

Debuggers are most often used to intercept or monitor the thread of control through a running program. It is usually the case that one or the other of the debugger or the target program are active, but not both. If the target is running, the user can interact directly with it while the debugger lies dormant. If the debugger is running, the user has its attention and the application target is usually stopped; i.e., its program counter advances no further. When the debugger is running, it is said to be in control; when the debugger causes the target to begin (or resume) execution, it relinquishes control.

The debugger can arrange to regain control when the target program counter reaches some pre-specified address. The debugger can deposit a machine instruction at that address, designed to cause some trap or to cause an operating system service to be called when it is executed. By virtue of prior arrangements between the debugger and the operating system, two things happen when the target reaches one of these instructions: 1) execution of the target process is put aside (i.e., the target process is stopped); and 2) the debugger is notified of the event and gains control. The debugger is able to determine the location of the event by examining program image state information saved by the operating system. Such special instructions, or the locii of such instructions, are called breakpoints. The event of execution arriving at a breakpoint is called the firing of a breakpoint.

Breakpoints are usually set at the direction of a user, who may want to know if and when execution reaches a certain point in a program, and may further wish to examine state information after the breakpoint fires. The user specifies where to insert the breakpoint: it may be on entry to a function, or at a location corresponding to some line number in the source code. The symbol table can be used to map function names and line numbers onto program image addresses. Some debuggers allow additional types of breakpoints, e.g., on return from a function.

There is a direct mapping between the structure of the source, and the structure of the program image, when a simple procedural language such as C, FORTRAN, or Pascal is used. If there is a function f in the source, then there is code for f in the program image. Furthermore, both of these structurings map directly onto the abstractions a programmer deals with in creating and administering a program. For example, if a function appears in the source, it will appear in the program image as a likewise contiguous entity.

However, with object-oriented languages such as C++, it is useful to think of objects as associating themselves with different functions over the execution of the program. For example, a window variable may be used for a window based on one set of functions at the beginning of the program, and a different set of functions later on. These functions may correspond to, for example, different hardware windowing technologies that are connected to the system where the program is running. The major strength of object-oriented programming is in the way it combines inheritance with run-time operator identification using virtual functions. The specific identity of a virtual function when invoked by name is to be determined at run time as a function of the object with which it is associated. In debugging object-oriented programs, it would be desirable to allow a user to insert a breakpoint that will fire whenever a specified virtual function is invoked on a specified object. However, since the symbol table is generated as part of program compilation, it cannot include sufficient information to determine where to insert the breakpoint. Thus, known debuggers that rely on only symbol table information to determine breakpoint addresses are not able to insert breakpoints that fire under conditions involving a run time association of functions with objects.

SOLUTION

This deficiency of the prior art is eliminated and a technical advance is achieved in accordance with the principles of the invention in an exemplary method used by a digital computer in controlling execution of an object-oriented program to effect a defined action, e.g., stopping the program, when a specified virtual function is invoked on a specified object during execution of the program. A breakpoint address is determined at run time, advantageously after the specified object is created in accordance with execution of the program. The breakpoint address determination is not based solely on symbol table, pre-execution, information, but in addition on information generated in conjunction with the creation of the specified object. The breakpoint is inserted while program execution is stopped at an intermediate program point after the specified object is created. After program execution is resumed and the specified virtual function is invoked in accordance with the program, the breakpoint fires. However, the defined action is performed only in response to determining that the firing occurred on the specified object.

In a method in accordance with the invention, execution of an object-oriented program is initiated and a specified object is created during execution of the program. After the specified object is created, a determination is made of the address of a function that is called when a specified virtual function is invoked on the specified object. A breakpoint is inserted at the determined function address.

Illustratively, the address determination can be made by obtaining the address and base type of the specified object. Using that information, a virtual function table is located for the specified object. The determined function address is obtained as an address from the virtual function table that maps, via a predefined address to function mapping, into the specified virtual function.

In a specific exemplary debugger embodiment for use with C++ programs, the symbol table generated as part of program compilation defines an address and a type for each program variable, where one of the program variables is a pointer to the specified object. The symbol table is used to determine the address and the type of the pointer variable. The contents of the determined pointer variable address are read to obtain the address of the specified object. Using the determined pointer variable type and the obtained object address, a virtual function table is located for the specified object. The virtual function table contains addresses for virtual functions. The determined function address is obtained as an address from the virtual function table, that maps, via a predefined address to function mapping, into the specified virtual function. A breakpoint is inserted at the determined function address and an entry is stored in a breakpoint table. The entry defines the determined function address and the obtained object address for the breakpoint. When firing of a breakpoint is detected after program execution is resumed, the address of the detected breakpoint and the address of the present object are ascertained. Only when the ascertained breakpoint address and present object address respectively correspond to the function address and object address of the entry in the breakpoint table, is the defined action performed. The method of processing breakpoints is also applicable to breakpoints on non-virtual functions.

A method, applicable to object-oriented programs which use parametric polymorphism, is used in controlling execution of a program to effect a defined action when a specified function is invoked with a specified argument. Execution of the program is initiated and an object is created. Thereafter, a determination is made of the address of a function that is called when the specified function is invoked with the specified argument and the specified argument is associated with the object. A breakpoint is inserted at the determined function address. After program execution is resumed and the specified function is invoked with the specified argument in accordance with the program, the breakpoint fires. However, the defined action is performed only in response to determining that the firing occurred on the object.

DRAWING DESCRIPTION

FIG. 3 is a diagram showing the contents of a symbol table and program image stored in the disk of FIG. 1;

FIG. 11 is a sequence diagram illustrating the operation of the exemplary debugger embodiment in inserting and processing breakpoints on virtual functions.

Detailed Description

The description which follows is arranged in three parts: 1) a number of basic concepts of object-oriented programming are discussed to aid in understanding the description of the exemplary debugger embodiment sdb++ of the present invention, 2) several key definitions are provided, and 3) the specific methods of the exemplary debugger embodiment sdb++ in inserting and processing breakpoints on both virtual and non-virtual functions are described. The programming language used herein is C++, as described in the 1989 book of Stanley B. Lippman, "C++ Primer". C++ is based on the C language which is described, for example, in the 1983 book of Stephen G. Kochan, "Programming in C".

Basic Concepts

Figure 1:
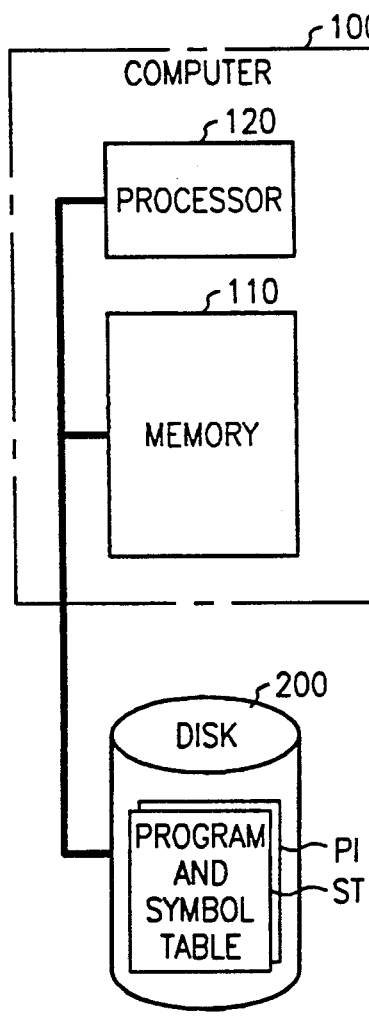
FIG. 1 is a diagram illustrating the elements of a computer system comprising a processor, memory, and disk.

The approach described herein is suitable for programs, referred to as "processes" in some contexts, that run on a digital computer 100 (FIG. 1). The steps for carrying out the tasks to be done by computer 100 are kept as encoded instructions in a memory device 110; the contents of memory device 110 are examined by a processor 120 which interprets them to carry out actions using its own internal machinery, devices, and functions. The collection of steps controlling this process are commonly called a program. Data values (inputs, interim values, etc.) are also maintained in memory device 110; they can be deposited there by processor 120, or examined at will by processor 120.

A secondary memory device, disk 200, keeps programs until they are needed for execution, at which time they are brought into memory 110 where they can be directly accessed by processor 120. Disk 200 (FIG.

3) holds not only the bits that represent the program control steps, for example, executable program image PI, but also may hold a symbol table for each program, for example, table ST, that ties its bits back to the information that was in the original program typed in by a person. Symbol table ST is used—usually by other programs such as linkers or debuggers—to interpret variable or function names as addresses in the running program. The columns of symbol table ST are characterized as follows:

1. NAME: For variables, this is their name, either per se or with some simple encoding done by the compiler. For functions, it is a name in which the function signature has been encoded by the compiler. For types, particularly for structure definitions, it is the corresponding C type or structure name.

2. TYPE: This indicates the C language primitive type, or derived type, as appropriate, for the entity named in the NAME column.

3. CLASS: This is a basic designation of what the entry represents: a function, a structure, a structure member, a local variable, etc. The use of the term "class" here is unrelated to the use of the same word to describe a user-defined type.

4. ADDRESS: The address, or offset, as appropriate, of the symbol defined in this entry. For types, which in and of themselves take no storage, the size is given in this field.

5. LINK: A pointer to an associated "parent" entry in the symbol table. For example, all structure members "point" to their structure declaration entry.

Processor 120 selects which parts of memory device 110 it reads and writes using an address it gives to memory device 110 along with its request to read or write. Usually, the reading and interpretation of an encoded instruction at some address will cause processor 120 to fetch a subsequent instruction, either at the following address or some other address.

To learn about the behavior of a program, it is often instructive to monitor its progress during execution. This can be done by arranging for the program to stop at prearranged points in its sequence of steps, at which time memory data contents can be examined. Such points are called breakpoints. A succession of arrivals at such points gives the programmer a feel for the flow of the program, and the data contents tell of its progress and intermediate results.

Figure 2:
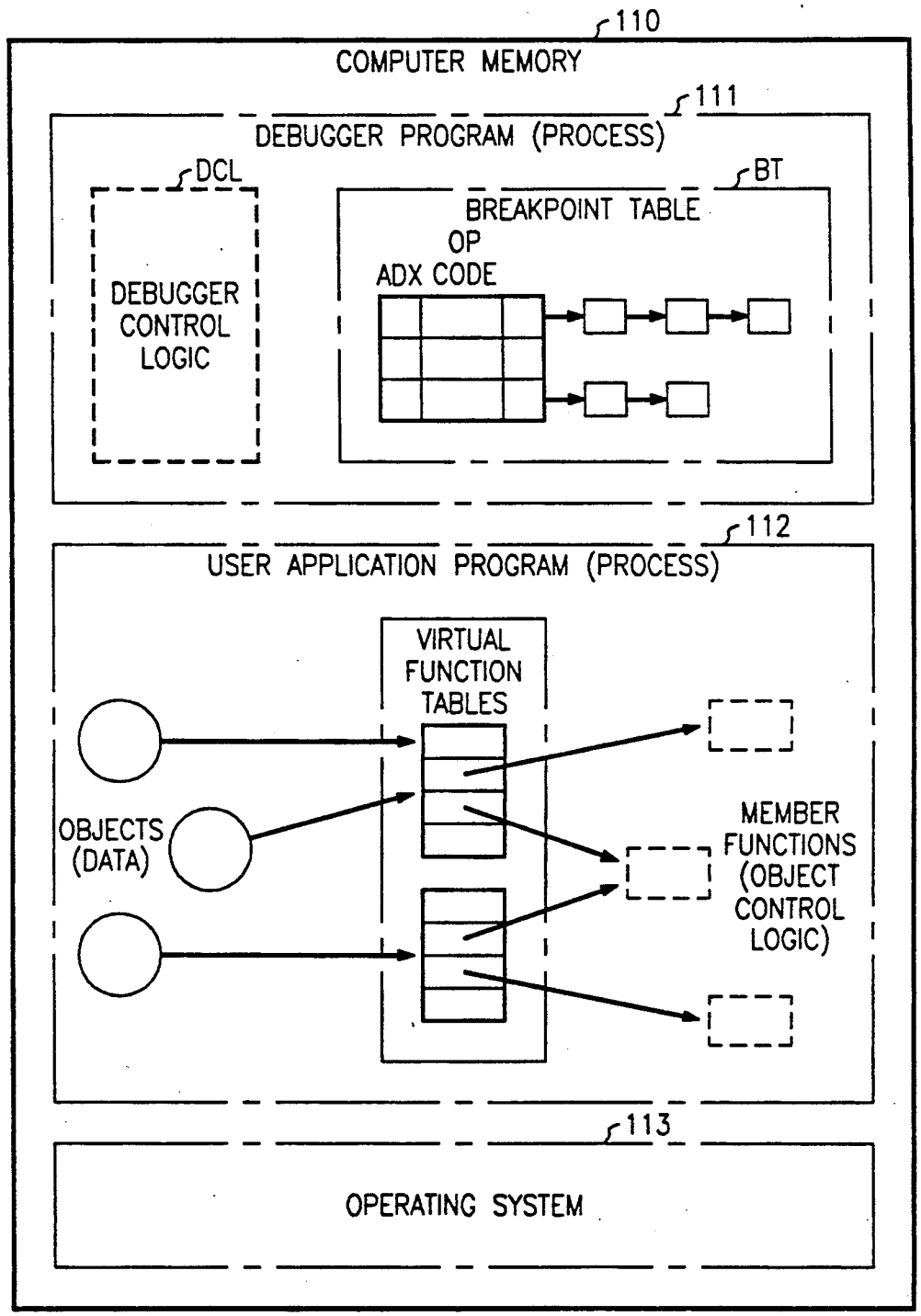
FIG. 2 is a diagram illustrating elements stored in the memory of FIG. 1 that are used to implement the exemplary debugger embodiment sdb++ of the present invention.

A user application program 112 (FIG. 2) under study is controlled and observed by another program, debugger 111. Debugger 111 coexists in memory device 110 with application program 112. The debugger contains its own control logic DCL, i.e., sequences of instructions for controlling its behavior, as well as its own data. The data include a breakpoint table, BT, having an entry for each of the breakpoints that have been inserted in application program 112. Breakpoint table BT contains information that allows each breakpoint to be interpreted in a number of ways, depending on the context of the application program when the breakpoint is reached.

The present approach focuses on applications made up of objects, instances of abstract data types that can be thought of as self-contained modules that specialize in performing some task. The objects are not physically self-contained; their data are in one place, and the instructions (text) elsewhere. The program text for a group of like objects (objects of the same type) is shared across all such objects. It is useful to think of objects as associating themselves with different functions over the execution of a program. For example, a window variable may be used for a window based on one set of functions at the beginning of a program, and a different set of functions later on. These functions may correspond to, for example, different hardware windowing technologies that are connected to the system where the program is running. There is a loose association between the objects and their program text, which is determined at run time through tables in the application program image. Debugging such programs offers a special challenge, since information generated by the compiler and typically available to a debugger cannot reflect the run-time dynamics of all but the most trivial programs. The debugger needs to determine the association between objects and their operations at run time, and that is what is addressed by the approach described here.

In the programming paradigm described above, all functions and most data (local function variables being the exception) are thought of as having their structure reflected in the source. Data abstraction presents an alternative model that is more dynamic: the programmer thinks of their source code as a description of templates that are used to stamp out actual incarnations, at run time. The templates have the characteristics of programming language types, and are called abstract data types, or ADTs. An ADT contains a template describing what data fields will be in a variable of that type. It also contains (semantically) the definitions of functions tightly associated with that type. These functions can be thought of as implementing the operations on that type, and the functions themselves are called methods or member functions. Such a facility makes user-defined types possible.

The language provides facilities for creating variables of these types. More precisely, these incarnations that can be "stamped out" by the type are called objects, and this term is usually associated with the "variables" that come from ADTs. Another name for an ADT is a class, which is related to the use of such abstractions in object-oriented programming. The process of making an object from a class is called instantiation.

The user model of objects may be that each one contains its own data, and its own copy of the member functions, as specified in the object's class. To refer to a datum inside an object, or to name one of its functions, requires two names: one to specify the object, and another to specify the named member. Thus, if s1 and s2 are both Stacks, and if a Stack contains an integer named index, then s1.index and s2.index represent two distinct entities in memory. Similarly, the user may think of s1.pop() and s2.pop() as calling distinct functions.

Figure 5:
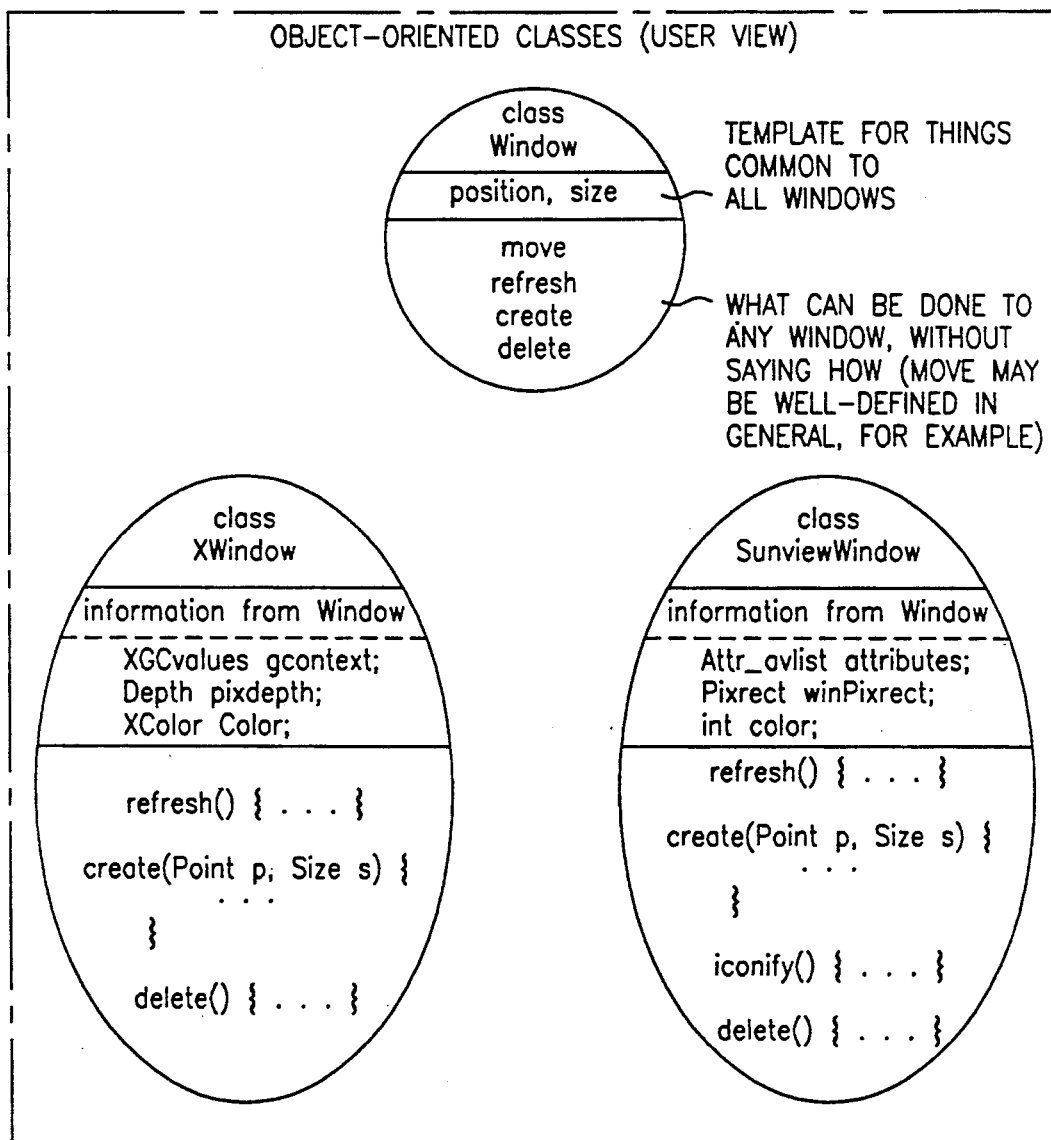

In an analogous example, illustrated in FIG. 5, each Sunview Window and XWindow contains a variable field named color and a function named refresh. In this example, it is not sufficient to simply refer to color; to characterize the color, it is necessary to name the class that contains it; that gives its type, and therefore its size, behaviors, etc., as well as its offset from the beginning of an object that might contain it. To get the value of any particular color thus characterized, the address of the object containing it is specified; together with the information about its characteristics, which are specific in the context of a given class, a debugger can use this address to retrieve or set the particular variable of interest. The same is true for member functions like refresh, where it may be helpful to insert a breakpoint for use in debugging the program.

Thus, data abstraction makes invocation of the same name possible in different objects having a common type. But it also allows a user to define a field (operation or instance variable) of the same name on multiple distinct types. Consider two unrelated classes, Stack and Table, each of which has a field (also called a member) named index. The object s is of class Stack, and object t is of class Table. These fields may have different offsets, or even different types, and the debugger must be able to disambiguate between them, as described below.

It is important to point out that actual implementation may not reflect the model. For example, some object-oriented languages are implemented using preprocessors that generate low level language text (e.g., C) as object code. There must be a way to reasonably map the structure of abstraction onto the low-level code without violating the rules of the low-level language. For this reason, most names inside an ADT are mapped to names that reflect the abstraction containing them. (This particular measure is not necessary in the case of simple ADTs, but becomes important when ADTs are combined in inheritance, and disambiguation of names is necessary inside the new abstraction.) For example, the variable index may be called __index__5Stack__inside class Stack, and__index__5Table__ inside class Table. The debugger must deal with this to give a feel of working in a truly object-oriented environment. An important part of the job of a debugger for object-oriented languages is to convert a user-supplied expression of the form aStack−>index (where aStack is assumed to point to an instance object of class Stack) into the expression aStack−>__index__5Stack__. It does this by finding the type of aStack, and using the resulting type name to construct the name of the member. The functions for doing this are well known.

Related to multiple names in abstraction scopes is the issue of dealing with overloading, using the same name for different functions. Within any given class, there may be, for example, two functions named print as shown in Table 1.

TABLE 1

```
class Foo {
public:
    void print(int);
    void print(char*);
};
```

If the user expresses a desire to insert a breakpoint on Foo::print, there is obviously an ambiguity. One way to resolve this ambiguity is to force the user to type a complete signature for the function they want to choose; i.e., to type the complete function declaration, including its name and arguments. For functions with many or complicated arguments, this is tedious and error-prone. Another tact is to search the symbol table for all functions that match the basic pattern suggested by the userspecified name, and to let the user refine that search by selecting the proper one from a menu built by such a search. This is the approach taken in sdb++.

Another way that implementation may not directly reflect the model is in function sharing. Assume the programming language does not allow modification of its functions as a side-effect of execution. Then it is possible in most environments for all objects of a given class to share the same member function text—they are all identical. The only requirement is that such functions be re-entrant (so multiple objects can simultaneously have activation records open on a single given function). This in fact is done in most environments supporting data abstraction and object-oriented languages.

Figure 4:
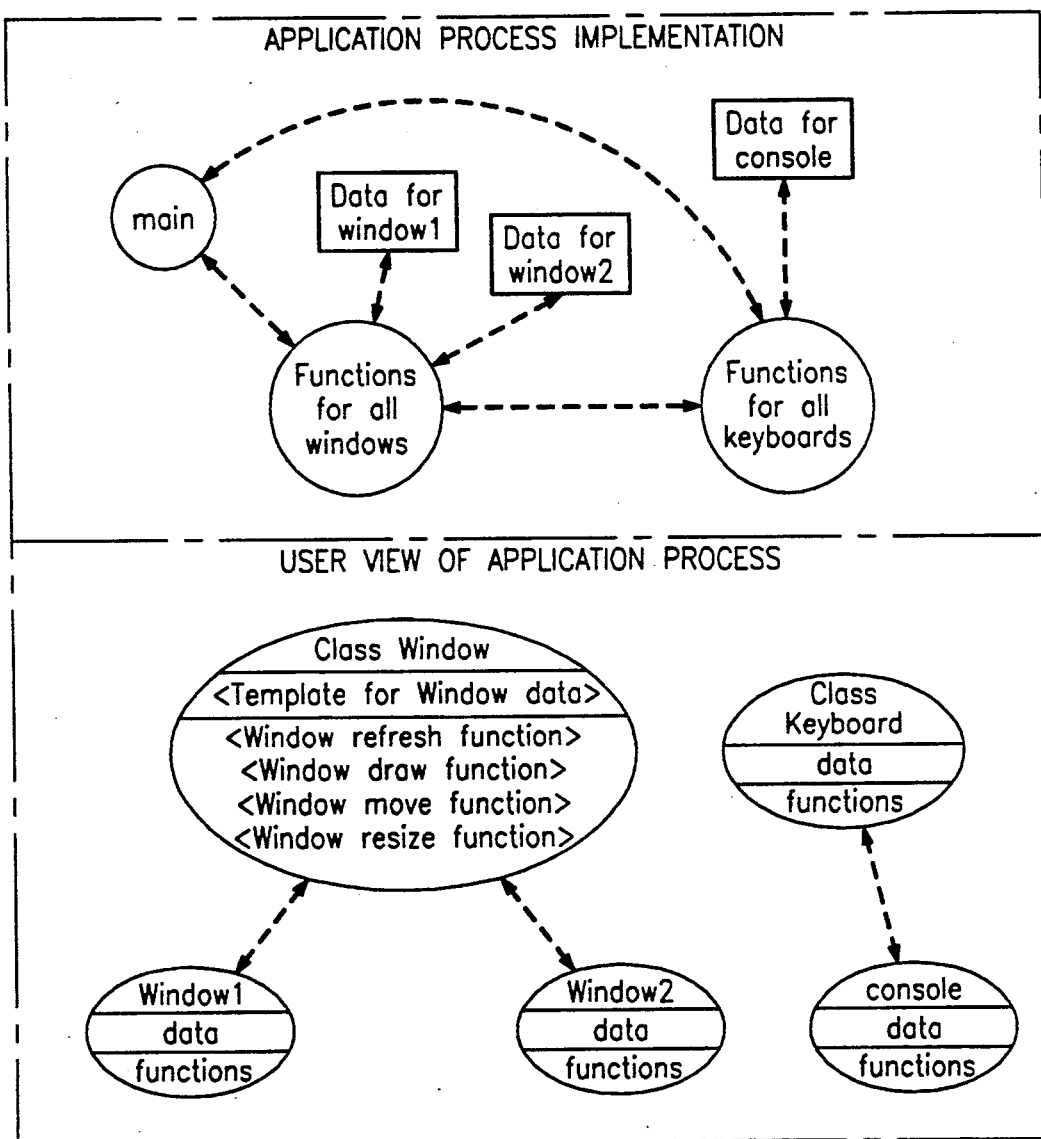
FIGS. 4–9 are diagrams illustrating a number of basic concepts of object-oriented programming.

FIG. 4 illustrates abstractions from both the implementation and user perspective for a language such as C++ using a typically available compiler. From an implementation perspective, the application target program (or process) can be viewed as a collection of functions and data. In a procedural language, each source function is reflected in the program as a contiguous block of memory, and each datum likewise occupies some space in memory (except for local data on stack machines, which are allocated automatically on the fly as functions are entered). In an abstract data language, all objects of a given type (ADT) share their functions. So if a program is modeling terminal window abstractions using a class Window, all individual Window objects (variables) would share the same functions that implement the functions for clearing, drawing, moving, etc. All functions for class Keyboard would also be shared by all Keyboard objects, probably in a way that does not overlap anything of Window's. If there are two windows, window1 and window2, each of those will get its own data block in memory. Likewise, there may be an object for the console's Keyboard object; it would also get its own block of memory. These memory blocks contain the data prescribed by the data declarations in the the corresponding classes. The variables inside a class are called instance variables or just instances. The class can be thought of as a factory that creates a new instance every time a new object is declared or dynamically created.

However, the user view of these abstractions may differ from the implementation. They may view class Window as a template that manufactures a self-contained object, complete with space for its own instance variables, as well as a copy of the functions prescribed for that object in the class. This allows the user to think of each object as an intelligent agent that can be asked to perform some task. The object can be "personified" as a "specialist" that acts autonomously on the behalf of another object when asked to do so. The fact that functions are shared for objects of like class is invisible and in fact usually irrelevant at the user level. The commonality does become an issue in debugging two different objects of the same class at the same time: modifications to their shared text (e.g., to insert a breakpoint) will cause what is done in the name of one object to interfere with the others (i.e., by causing the specified breakpoint to happen for all of them).

Object-oriented programming offers a level of abstraction above that provided by ADTs: the ability to group classes themselves into yet more abstract classes. Furthermore, object orientation makes it possible to address objects of specific types in terms of the interface of any of the more highly abstract types which derive those objects' type. The example of FIG. 5 illustrates the utility of this property.

Assume that a class XWindow is used to implement the semantics for manipulating a window created using the X window system. It contains declarations of instance data that hold information pertinent to the details of maintaining windows: pixel depth, color, etc. The class also defines the functions to do what needs to be done to X windows: refresh, create, delete, and so forth.

There is a second class, Sunview Window, which is similar, but which serves to communicate with windows running in a different environment or perhaps on a different kind of terminal or work station. It, too, has its instance data-those pertinent to Sunview technology, in this case-and also has functions defined to carry out the details of refreshing, creating, and deleting Sunview windows; one may also be able to iconify them, and there is a function for that. Except for the latter function, it is noted that SunviewWindow exhibits behaviors, as defined by its member functions, that closely mimic those of XWindow. That is no surprise, since they are both windows. In fact, it is recognized that there is a more general abstraction called Window of which both XWindow and SunviewWindow are specializations. Window tells what all windows, in general, do.

In addition to that, it is noted that all windows have a position and a size, and that such parameters might be specified in a fashion independent of their implementation technology. These properties can be thought of as belonging to Window instead of to the particular specialized classes. They appear as instance data in the general Window class itself.

In fact, even some behaviors of all windows may be able to be completely specified in terms of the other behaviors, in a way that is technology-independent. For example, move might be implemented by redefining the value of Window's position instance variable to take on the value passed as an argument, after which the draw operation is invoked.

The classes XWindow and SunviewWindow are said to be derived from class Window. Everything that a Window has inside of it, they get. Whatever interface a Window has, XWindow and SunviewWindow must adhere to, though they can extend it. A class that derives some of its properties from another is called a derived class or subclass; a class that serves as a base for derivation by others below it is called a base class or superclass. The derivation relationship between these classes is specified in the programming language as given by the code in Table 2. (The code of Table 2 is not syntactically perfect C++, and should be regarded as pseudo-code).

TABLE 2

```
class Window {
public:
            virtual void move( );
            virtual void refresh( );
            virtual void create( );
            virtual void delete( );
private:
            Position position;
            Size size;
};
class XWindow: public Window {
public:
            void refresh( );
            void create( );
            void delete( );
private:
            XGCvalues gcontext;
            Depth pixdepth;
            XColor Color;
};
class SunviewWindow: public Window {
public:
            void refresh( );
            void create( );
            void delete( );
private:
            Attr_avlis attributes;
```

TABLE 2-continued

```
            Pixrect winPixrect;
            int color;
};
```

Figure 6:
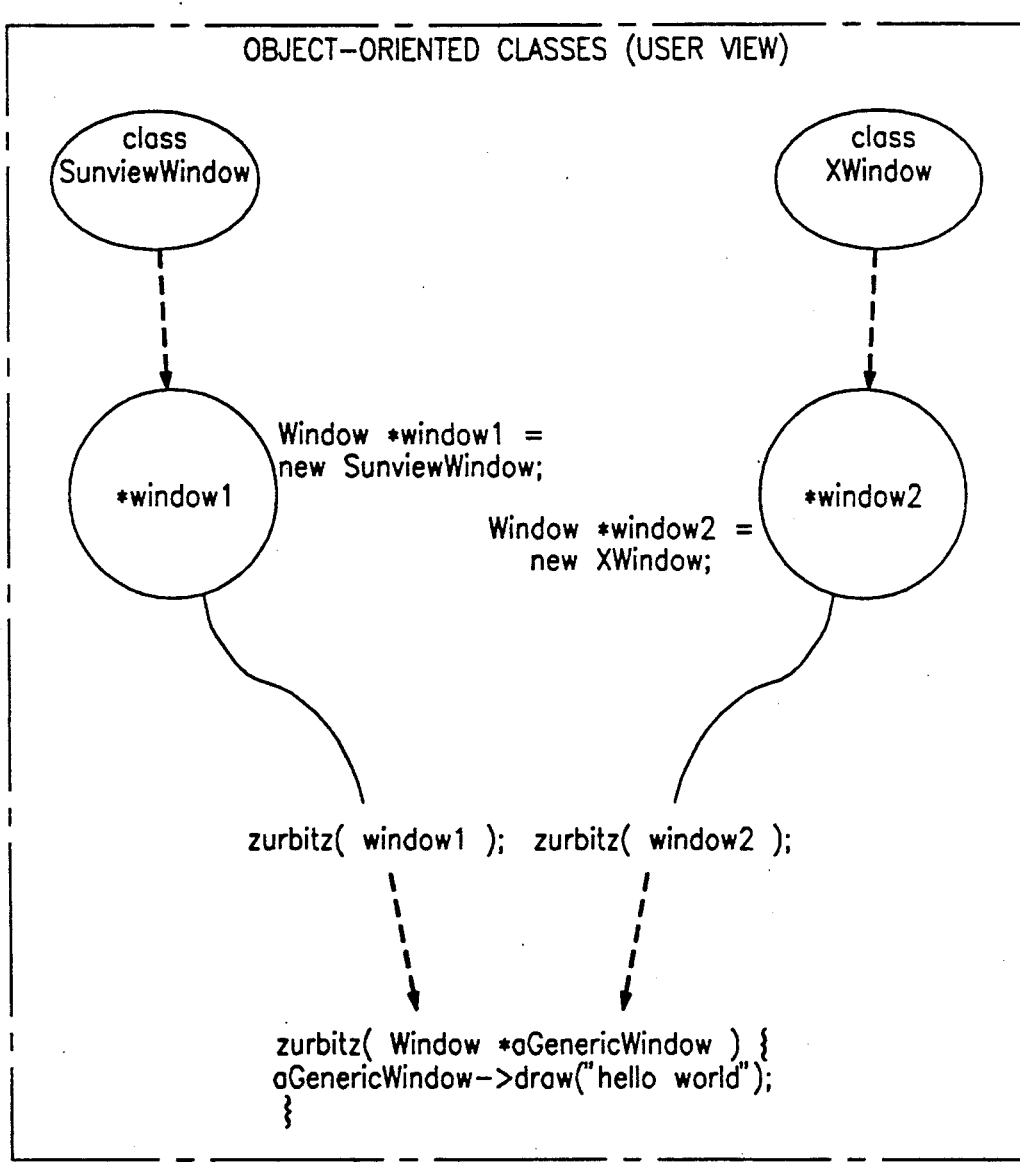

A window of a specific type can often be treated as though it were of the more general Window type. For example, a variable declared to point to a Window might be initialized to point to a newly created XWindow. This is not a type problem; because XWindow is a subtype of Window, the assignment is legal, for much the same reason that assignment of an 8-bit integer into a 16-bit integer is legal in most languages. FIG. 6 illustrates some Window pointers being set up just in this fashion, to point to windows of specific types. The code is given in Table 3.

TABLE 3

```
Window *window1 = new SunviewWindow;
Window *window2 = new XWindow;
```

Now assume there is a function zurbitz (Table 4) which is designed to operate on any kind of window. It takes a window, and prints "hello world" in it.

TABLE 4

```
void zurbitz(Window *aGenericWindow) {
    aGenericWindow->draw("hello world");
}
```

It is legal to invoke the calls of Table 5.

TABLE 5

```
zurbitz(window1);
zurbitz(window2);
```

In the first case, zurbitz will determine at run time that it has to invoke SunviewWindow's draw function, though it has no compile-time basis for making that decision. In the second case, a similar run-time decision is made, ending up inside XWindow's draw. There needs to be information inside each object that gives zurbitz enough information about its type for that or any analogous function to make a decision about what to do. In addition, there have to be data structures and conventions known by the compiler to make it possible to get to the right operation at run time.

This "lookup" of type information only is done in C++ for virtual functions. This implements a degree of polymorphism, called inclusion polymorphism, in object-oriented languages, and is the keystone to object orientation. A virtual function of Window is one that Window asserts as not being its own; i.e., as being defined in the derived class. If a function is virtual, then the determination of which function to call is made on the basis of the type of the object, the type which was used to create it. This type is somewhat independent of the type declaration of the variable that names the object. (The variable is typically declared as a pointer to a superclass of the object's class). In C++, if the function is not virtual, then the determination of which function to call is made at compile time based on the type of the pointer or variable being used to invoke the function, instead of the type of what is actually pointed or referred to.

When the compiler analyzes the template specified by a user for some class, it may add some housekeeping information of its own to manage the run-time operator lookup described above. This information maps directly onto the class or type of the object, and can be found in all objects that are being used in an objectoriented fashion (i.e., those that are from classes having virtual functions).

The most important piece of information put into an object is a pointer called the virtual function pointer. This pointer references a table; the table comes from a class, and contains the addresses of that class's functions. The table is generated automatically by the compiler, as is the insertion of the pointer in the object. The initialization of the pointer's contents are also arranged by the compiler to take place properly when a new object of a given class comes into being. Note that all objects of like class will have the same contents in their pointer field.

Another key point is that all classes in a derivation hierarchy will specify that this function table pointer be at the same offset from the beginning of the class. The offset can be set as being "just beyond" the data of the base-most class. (Actually, it will come "just beyond" the data of that class highest in the derivation hierarchy, all of whose superclasses contain no virtual functions, and the pointer is positioned subject to other byte alignment constraints imposed by the computer's architecture.) Instance data from classes farther down the inheritance tree will be appended to the instance following the pointer; note that additional levels of derivation do not affect the offset of the pointer. That means that if a base class pointer points to an object of any class in that derivation tree, the function table pointer can be found given the address of the object. For objects of different classes in a hierarchy, the value of this pointer will be different, and that is how the operator invocation mechanism determines how to call the right function at run time.

Within a derivation hierarchy, all functions of the same signature have the same virtual function pointer table index assigned to them. By signature, what is meant is basically the function's name, so all like named functions will share some position on the table. (Signature is complicated beyond name by the appearance of multiple functions with the same name but with different argument lists; functions with like names but different argument types are said to have different signatures.) This property is managed by the compiler, and the compiler assigns ascending indices to class member functions in the order of their appearance in the source stream.

Figure 7:
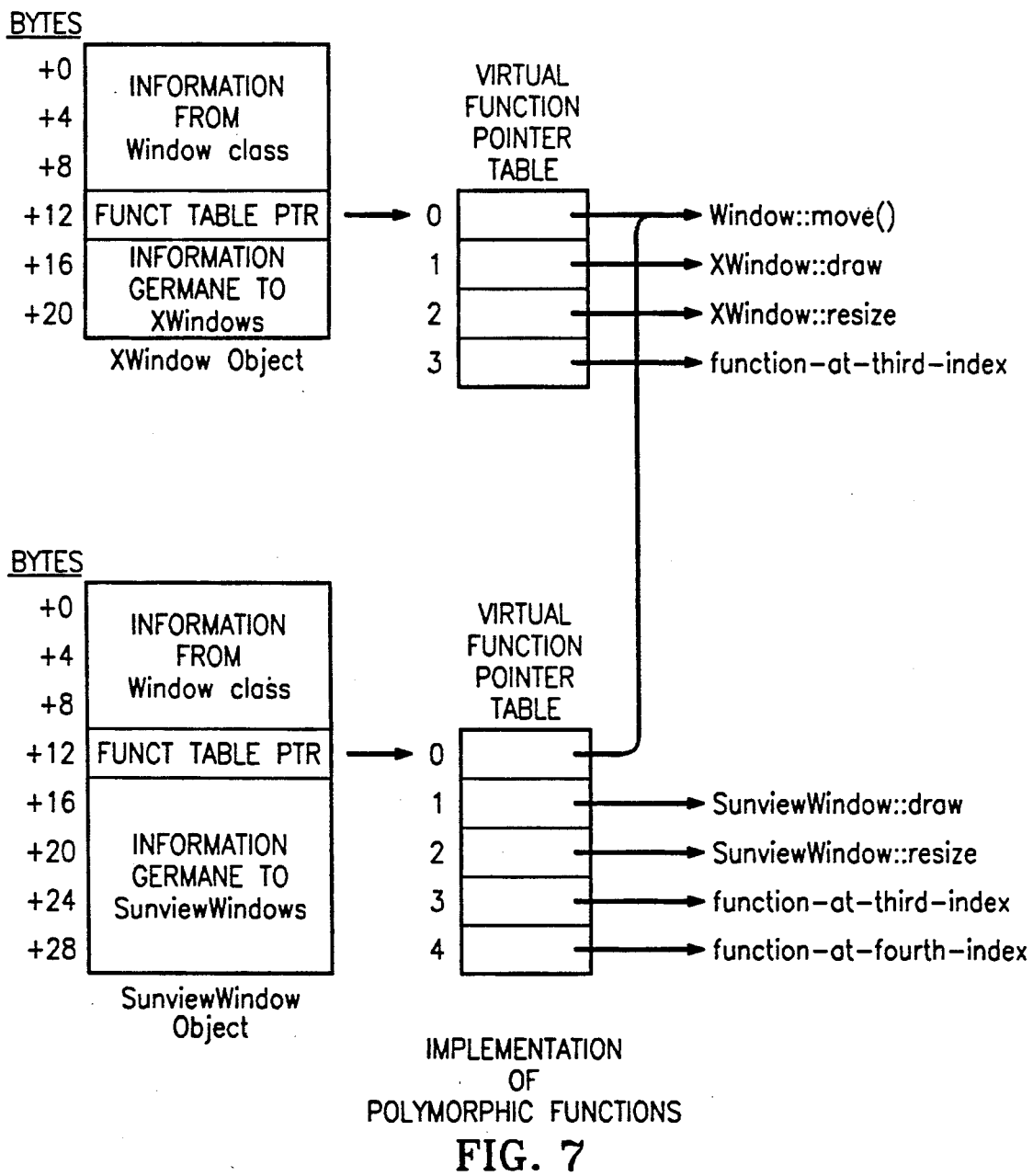

Consider the example of FIG. 7. If the compiler is to generate code for a call for a function on some object that it knows is in the Window hierarchy, it knows what to do. For example, consider the code of Table 6.

TABLE 6

Window *window1 = new SunviewWindow;
window1->draw("hello world");

The compiler would arrange to generate code to perform the following steps:

1. Get the address of the beginning of the object (in window1).

2. Add to that address the offset of the function table pointer that is common to all classes in the hierarchy in which class Window appears. (Class Window is used as the criterion here, because it is the type declared for the variable window1.)

3. Pick up the value at that address.

4. To that value, add the offset associated by the compiler with the signature draw (char*). The result is an address within the virtual function pointer table.

5. Take the contents at the addressed part of the function pointer table, and interpret them as the address of the function which is to be called.

6. Call the function, passing the address of the beginning of the object as the first parameter. (This allows code within the routine to access fields of the object that it "lives inside of".)

Note that virtual function pointer tables can share functions. For example, note that both Sunview Window and XWindow have assigned their zeroeth slot to move, and that it ends up being the same function in both cases. This occurs when the subclasses choose not to redefine the default semantics of a base class.

Figure 8:
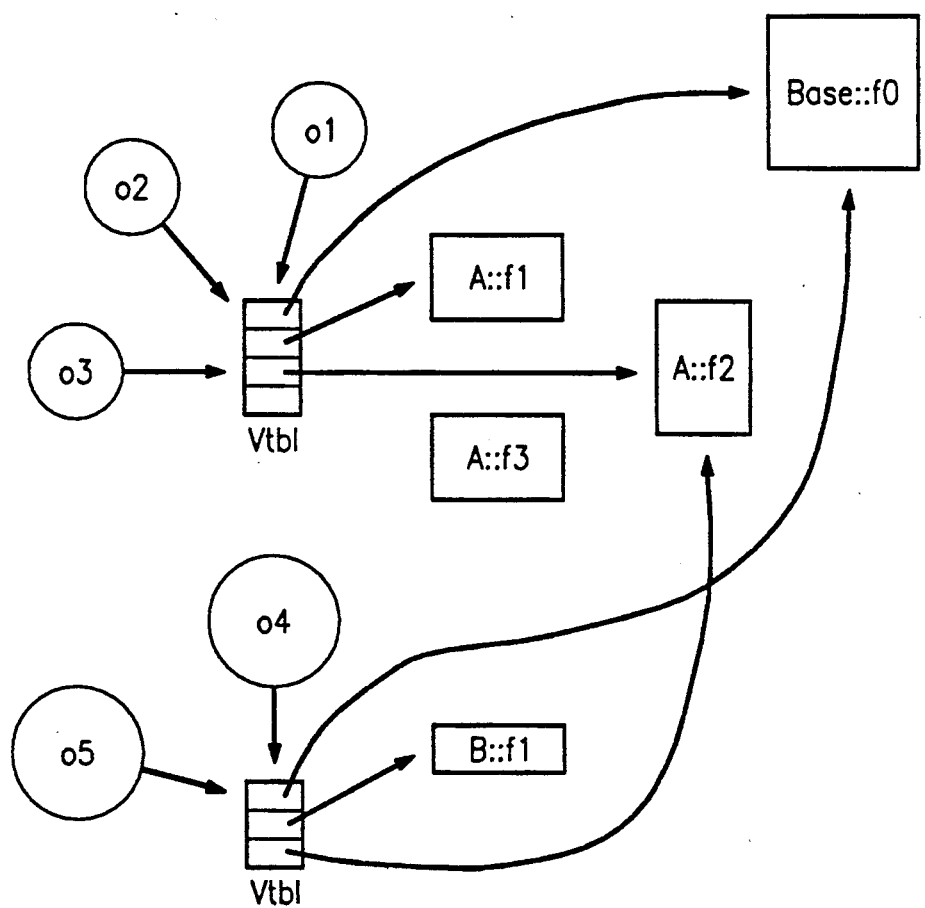

FIG. 8 illustrates the elements of a program in execution. The program comes from source which declares three classes: Base, and its subclasses A and B. There are three objects of class A, pointed to by the contents of variables named o1, o2, and o3. There are also objects of class B pointed to by o4 and o5. The classes themselves don't have a complete presence in the running program, but their declaration is reflected by a virtual function table (vtbl) deposited in the object code by the compiler for each of them. Each instance variable contains a pointer to the virtual function table for its corresponding class. The virtual function tables contain pointers to the functions for their respective class.

Object member functions are invoked in C++ using a member selection syntax where the pointer to the instance and the function name are separated by the -> operator. To invoke the f() operator on the object pointed to by o3, one would say o3->f() in C++. The C++ translator tranlates this into the C code: (*(o3->vtbl[0])) (o3) where the zero index is mapped from the function name f by the compiler. The index will be different for a function with a different signature, but the index will be the same for all functions named f taking no arguments (name and arguments together constitute signature), for all classes that share a common parent having a function with that signature. The actual parameter o3 passed in the C code is a pointer to the object being operated on; it allows code in A::f() to access local variables of class A in the instance itself.

DEFINITIONS

An object-oriented program is a program used to control the execution of a digital computer, where the program is created using a set of language tools, abstractions, and constructs that support user-defined types, where the types are created to have an association with a given collection of declared data and operations on those data. Variables, or instances, of such types in the running programs are called objects. These types are sometimes also called classes. Furthermore, such types can be related to one another through the inheritance of some first type's properties, behaviors, data, and operations, by some second type, where the inheritance can result in a total incorporation of the first type's behavior by the second type, or with selective redefinition of the behaviors, properties, and operations, under the control of the programmer. Furthermore, types may define named functions, operations, and behaviors on two or more types in a hierarchy of such inherited types, the specific identity when invoked by name is to be determined at run time as a function of the type of the object being operated on instead of as a function of the variable to which the object is bound. Furthermore, any object created from any class in such a hierarchy may be bound to (named by) a name declared to be associated with a base type of that class. Furthermore, such a program may contain or make use of procedures and data which are not thus connected through types, and may contain or make use of other types whose behavior is defined by the compiler, operating system, or other part of the environment not directly under the user's control.

A virtual function is a function or operation defined as a behavior of some user-defined type, where that type participates in a hierarchy of other types. The specific identity of the virtual function when invoked by name is to be determined at run time as a function of the object with which it is associated. Each of several types in an inheritance hierarchy may contain its own definition of such a function where the name is common to all such types, and if the function is a virtual function, as determined by and under the control of the programmer, then the function that is invoked at run time will be determined (by the run-time environment, operating system, code generated by the compiler, or through other means) from the type of the object which is the primary operand of the function, instead of from the type of declared name that designates the object on which the function is to operate. Calls to virtual functions can be implemented as indirect calls through a table, called the virtual function table, which is created by the compiler for each user-defined type.

One abstract data type can be said to inherit the properties—i.e., the data and behaviors—of another. That is, in creating a type, one may start by building on an existing type, similar in nature to the one to be created. To that unmodified type, one defines "amendments" to the definition of its implementation or behavior; the base type plus these refinements create a new type that inherits the properties of the original. Several "child" classes can inherit the behaviors of a common parent. Examples: squares inherit from rectangles; circles from ellipses; stacks and queues from collections; different kinds of windows from a common window base.

A group of classes mutually related by inheritance often share the same set of behaviors, the same interface to the outside world. If some code wants to access an object of one of the classes in that hierarchy (more properly, it may be a lattice), it may do so through its well-defined interface. There is much to be gained by writing code general enough so it can logically deal with an object of any one of the types in a given inheritance chain. However, the compiler must ensure that when the user says to apply the function "refresh" to the object at hand, that the "right" refresh gets called, the one appropriate to the class of the object at hand. Thus, many forms with the same interface may appear in a given context; this is called polymorphism.

A base type of an object is any class, in the inheritance hierarchy containing the object's class, which is (improperly) higher in the hierarchy than the object's class.

EXEMPLARY DEBUGGER EMBODIMENT

First consider the processing of a simple breakpoint. Assume that it is desired that a breakpoint fires whenever the f operation is invoked on any object of class A. This extends to invocations of f on objects of those subclasses of A which themselves do not redefine f. The function A::f can be treated as a simple single function: whenever the function is entered under any condition, we want control to transfer from the target process to the debugger. This is easily accomplished using techniques found in most contemporary debuggers, which implement variants of steps described below. Assume the debugger command "stop at A::f" has been entered. Then:

1. The debugger parses the command, recognizing it as a breakpoint command.
2. The operand is analyzed, and is discovered to indicate the name of a class and a function of that class. The operand is parsed into those two components.
3. In a language like C++, the class name (A) and the function name (f) are processed by a name mapping scheme that produces a single name (e.g., _f_1A_) which names the function found in the C code generated by the C++ translator.
4. The symbol table is searched for the generated function name, and the function address is extracted from the symbol table entry (FIG. 3).
5. The machine instruction at the generated address is retrieved from the application process by the debugger, and stored away for future reference in association with the function name.
6. The machine instruction at the generated address is overwritten with an instruction that will cause a breakpoint to occur; i.e., to cause a trap or other diversion which will, through conventions of the environment, cause control to be transferred from the application process to the debugger.

When such a breakpoint "fires," the saved instruction is temporarily replaced and the application program single-stepped through it, and then control is returned to the user.

ACTORS STYLE BREAKPOINTS FOR NON-VIRTUAL FUNCTIONS

Assume that the program of FIG. 8 is being debugged, and that it is first desired to set a breakpoint to fire whenever f0() is invoked on the object pointed to by o2. This is a so-called Actors-style breakpoint. In Carl Hewett's Actors model of computation as described in an article by John R. Pugh, "Actors Set the Stage for Software Advances", *Computer Design*, September 1984, each object is viewed as self-contained and autonomous. The target program is to return control to the debugger when A::f0() is entered, but only if it is invoked with o2 as an operand.

Figure 9:
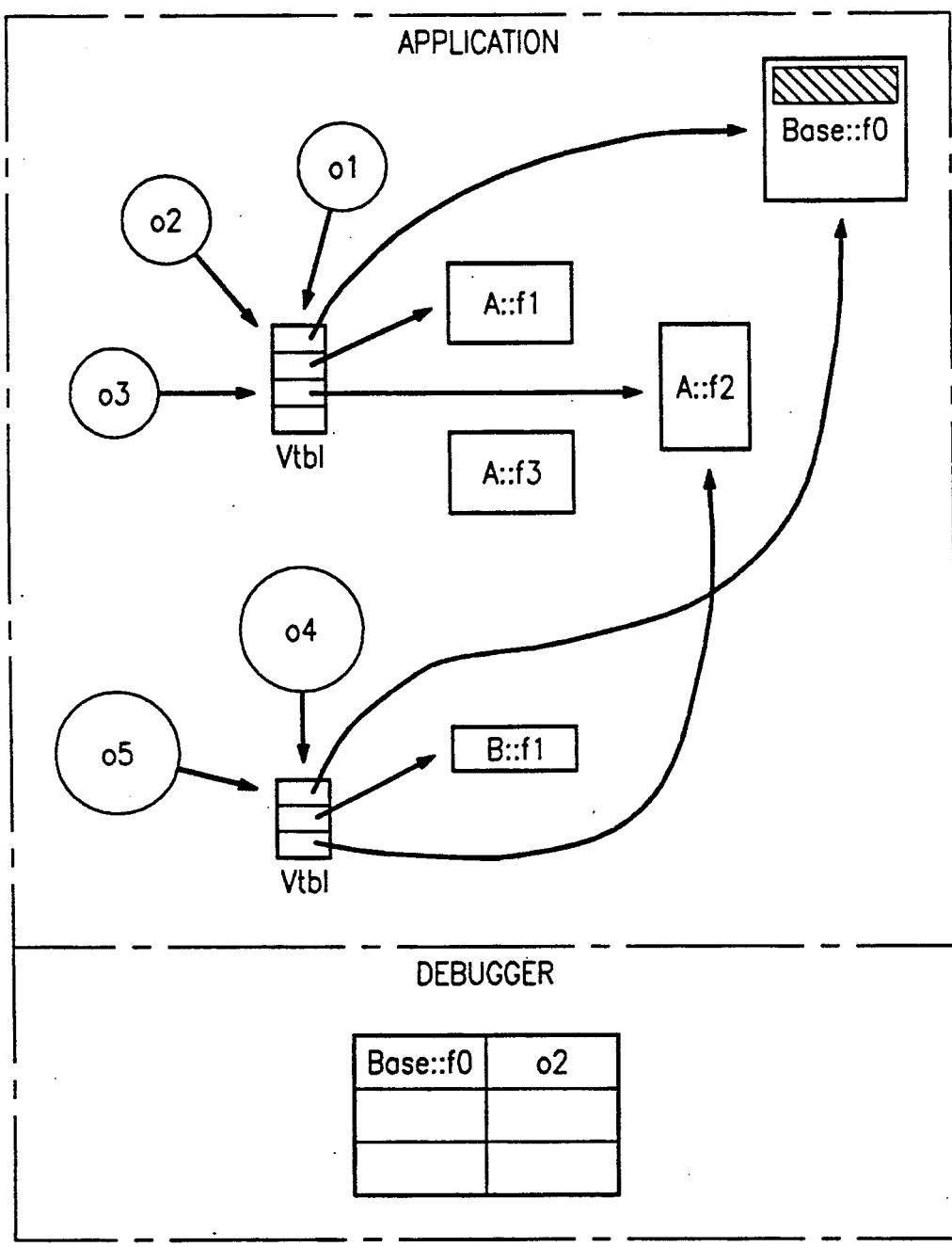

The basic approach is to plant a breakpoint in f0(), and to record in a table that we are to be interested in the firing of this breakpoint whenever it is invoked on o2 (FIG. 9). If the breakpoint fires, the program is inspected, by looking on the stack, to find out what the operand of the function was when the function was invoked: if it is o2, control is returned to the debugger, otherwise the application process is silently restarted.

There are some subtleties to accomplishing this. For example, how do we find which of the potentially many functions named f0() is to have the breakpoint inserted in it? Assuming that the user directed the debugger: stop at o2 −>f0, the following steps are performed as illustrated in the event sequence diagram of FIG. 10.

1. The debugger parses the command, recognizing it as a breakpoint command.
2. The operand is analyzed, and is discovered to indicate the name of an object pointer, and a function related to that object. The operand is parsed into those two components.

3. The symbol table is searched for the variable containing the object pointer e.g., the first entry of table ST (FIG. 3). From that symbol table entry, the structure tag of that variable is found. In C++, this structure tag names the original class of the original C++ text. This is the Type field of the first entry in table ST (FIG. 3).

4. The name mapping scheme is applied to produce a single name (e.g., _f_1A_) which names the function found in the C code generated by the C++ translator.

5. The symbol table is searched for the generated function name, and the function address is extracted from the symbol table entry.

6. The breakpoint header table is searched for an entry containing this function address. This is a simple table whose fields are: a function address, a saved op code for the location where an associated breakpoint or trap instruction is planted, and a breakpoint list pointer.

The breakpoint list pointer points to a list of one or more breakpoint structures. A breakpoint structure entry contains an address of an object which must be the operand of this function invocation in order for this breakpoint to fire; a pointer to the next breakpoint structure, and a flag indicating whether the breakpoint is an Actors breakpoint or a "regular" (non-Actors) breakpoint. This flag is used when the breakpoint fires to determine if the breakpoint should be processed an an Actors breakpoint, conditional on the identity of the object operand, or if it should be unconditionally processed.

If a header table item is found whose address field matches the function address, skip to step 10; otherwise, proceed to the ensuing step.

7. Create a new header table entry, and store the newly found function address in the appropriate field. Initialize the breakpoint structure list pointer to designate an empty list.

8. Save the machine instruction at the function address in the appropriate place in the newly generated table entry.

9. The machine instruction at the function address is overwritten with an instruction that will cause a breakpoint to occur.

10. Search the breakpoint structure list for a matching entry; if one is found, this is a redundant breakpoint and gets exceptional handling (error or warning).

11. Create a new breakpoint structure. Designate this as an Actors breakpoint.

12. Taking the name of the variable containing the object pointer, go to the symbol table and find its address.

13. Go into the target process at this address, and retrieve the contents there. The result will be the address of the object (operand) of interest.

14. Store that address in the appropriate field of the newly created breakpoint structure.

Now, when a breakpoint fires, the debugger searches the breakpoint header table for an entry with a matching address field. The debugger can also inspect the target process and retrieve the value of the address of the current operand (by retrieving the value of the variable this (or_0this, its equivalent) from the current activation record). In the list associated with the identified breakpoint header table entry, the debugger searches for a match with that address. If such a match is found, the breakpoint is processed by keeping control in the debugger; i.e., not returning control to the application process except to temporarily restore the original op code and step the program over it, and then restore the trap instruction. If such a match is not found, then the original instruction is replaced and stepped, the breakpoint trap is replaced, and execution of the application process is resumed. Non-Actor non-virtual breakpoints are handled in a fully general way, parameterizing the debugger tables appropriately, instead of being handled in the isolated way they were introduced above.

ACTORS STYLE BREAKPOINTS FOR VIRTUAL FUNCTIONS

The major strength of object-oriented programming is in the way it combines inheritance with run-time operator identification; i.e., with virtual functions. This is sometimes referred to as inclusion polymorphism. The result of this is that an inheritance hierarchy of several classes may contain multiple functions, all of the same name f, each declared in its own class. A pointer declared to point to an object of the class at the apex of that hierarchy may legally point, at run time, to an instance of any class in the hierarchy. Therefore, if the pointer is used as the operand of a member function call, there can be no compile-time determination of what function is intended to be called. The function that is selected for execution will be determined at run time as a function of the class of the object being pointed to, instead of being determined at compile time as a function of the type declaration of the variable holding the pointer.

Return to the Window example of FIG. 6. Assume the code of Table 7.

TABLE 7

```
1: Window *window1;
2: window1 = new SunviewWindow;
3: for(int i = 0; i < 2; i++) {
4:     window1->refresh( );
5:     window1 = new XWindow;
6: }
```

Figure 10:
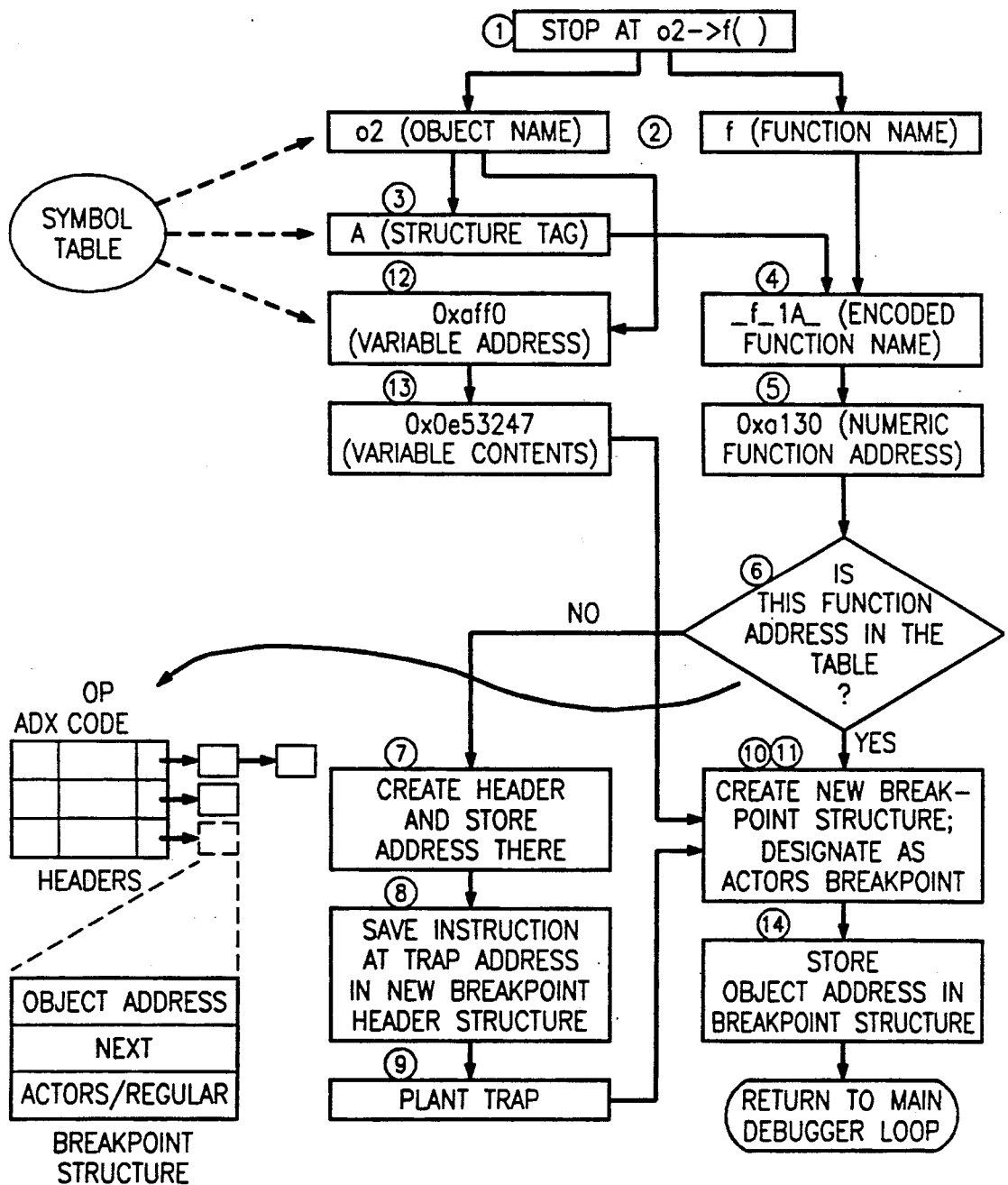
FIG. 10 is a sequence diagram illustrating the operation of the exemplary debugger embodiment in inserting and processing breakpoints on nonvirtual functions.

Assume that the refresh() operation on Window is declared as a virtual function, i.e., one whose identity is to be determined at run time. Assume that execution is stopped (because of a breakpoint) at line 3. The following instruction is given to the debugger: stop in window1->refresh(). Clearly, the techniques of the routine of FIG. 10 are brought into question: what is meant by this directive? To set a breakpoint on Window::refresh() for the object pointed to by window1? The more reasonable and powerful semantics that are adopted here are to plant a breakpoint at the refresh operation for whatever instance window1 is currently pointing to. If window1 is reassigned, the breakpoint follows the original object. Even if window1 were to be reassigned to point to another (distinct) SunviewWindow, it would have no breakpoint semantics: the breakpoint is to be associated with the object, not with the pointer variable or its declared class. But, more importantly, the choice to "plant a breakpoint on a member function of some object", must presume the existence of an object in this case. The reason the object needs to exist here is so the debugger can inspect it to determine which f function it "contains"; in the previous case, there was exactly one actual f, though it could be envisioned as having replicated itself in many objects of the same class. Here, there are not only different objects, but they may contain different and distinct functions named f, and compile time foreknowledge is inadequate to tell which one it will be.

Because the compiler annotates the symbol table only with that information available at compile time, the debugger cannot rely on the symbol table alone to compute which function should be the target of a breakpoint, if the function falls into this category. Instead, the debugger needs to analyze structures produced by the compiler that are present in the instance data of objects inside the active application program image itself. Such analyses are done at run time. Though the C++ compiler does not arrange for objects to be self-describing, there is enough information in the program image to be able to deduce the type of an object of a class with virtual functions. Assuming that the user directed the debugger: stop at o2−>f, the following steps are performed as illustrated in the event sequence diagram of FIG. 11.

1. The debugger parses the command, recognizing it as a breakpoint command.

2. The operand is analyzed, and is discovered to indicate the name of an object pointer, and a function related to that object. The operand is parsed into those two components.

3. The symbol table is searched for the variable containing the object pointer. From that symbol table entry, the structure tag (class name) is derived.

This symbol table entry, generated by the compiler, contains things that are knowable about the symbol at compile time: its type, and its address in memory. For automatic (stack) variables, the symbol table usually contains an address field that corresponds to the symbol's offset within the activation record of the function in which it is declared; for external symbols, it is an address in the program's logical address space. While the base type of the pointer is compile-time knowable, object-oriented languages allow such pointers to validly point to an object of any subclass of its declared base type, so something declared to point to a Window may validly point to a XWindow or a SunviewWindow at run time. So the class identified by this step is that corresponding to the pointer, not to the actual object it points to.

4. From the same entry, extract the address of the operand variable.

5. Go into the target process at this address, and retrieve the contents there. The result will be the address of the object (operand) of interest.

6. The symbol table is searched for an entry describing the fields of the structure named by the tag (class name) found above.

7. From that entry, the offset of the virtual function table pointer vptr) is extracted.

8. Add this offset to the address of the object (operand) retrieved above, yielding the address of the word pointing to the vtbl associated with this object.

9. Retrieve the word at this address in the application program image; it is the address of the virtual function table (vtbl) for this object's class. The virtual function table is basically a list of pointers to functions; the index into such a table for a function of any given name, will be the same for all such tables and all such functions in classes participating in a derivation hierarchy whose root contains a function of that name. The virtual function table actually contains a structure in which the function pointers are embedded.

10. The basic approach is to go through the virtual function table one element at a time, extracting function addresses from successive elements. Since function addresses are unique within a program, and function names are unique, there is a full, unambiguous and unqualified mapping back and forth between addresses and function names. However, in an object-oriented language like C++ that uses C technology for intermediate steps of the compilation process, the function names generated at the intermediate level may consist of two parts encoded together into a single name, those two parts being the class name and the function name. The full signature (argument types, as well as the function name) is thus encoded into the name in C++ translation systems. The encoding is reversible; the class and function names can be reconstituted unambiguously from the encoded name. What is desired is to find the entry in the virtual function table whose function name component matches the function name specified by the user in Step 2; their indication of what class this function must apply to is deduced through this function, deriving from the object pointer supplied by the user, and from information available at run time from the object pointed to itself. So, in detail:

Iterate over the virtual function table, and for each element do the following:

a. Extract the function address for this entry.

b. Do reverse symbolic resolution on the address; i.e., turn the address into a function name. This can be done by a linear scan of the symbol table or using internal data structures that support efficient performance of such reverse resolution.

c. Compare the function name component of the name/class pair thus generated with the name generated in the name parsing process from step 5 above. If there is a match, yield the address of the function and exit the loop.

d. If the end of iteration is reached without finding a match, then this is not a virtual function Actors breakpoint, but is rather a non-virtual function Actors breakpoint, and the steps depicted on FIG. 10 should be applied. Normally, the steps of FIG. 11 are applied first and, on this failure, the FIG. 10 sequence is entered at the appropriate point (e.g., Step 4) to avoid recalculation of data.

11. The address of the virtual function is now in hand. The breakpoint header table is searched for an entry containing this function address. If a header table item is found whose address field matches the function address, skip to step 15; otherwise, proceed to Step 12.

12. Create a new header table entry, and store the newly generated function address in the appropriate field.

13. Save the machine instruction at the generated address in the appropriate place in the newly generated table entry.

14. The machine instruction at the generated address is overwritten with an instruction that will cause a breakpoint to occur. Initialize the breakpoint structure list pointer to designate an empty list.

15. Search the breakpoint structure list for a matching entry; if one is found, this is a redundant breakpoint and gets exceptional handling (error or warning).

16. Create a new breakpoint structure. Designate this as an Actors breakpoint.

17. Store the object address in the appropriate field of the newly created breakpoint structure.

Now, when a breakpoint fires, the debugger searches the breakpoint header table for an entry with a matching address field. The debugger can also inspect the target process and retrieve the value of the address of the current operand (by retrieving the value of the variable this (or_Othis, its equivalent) from the current activation record). In the list associated with the identified breakpoint header table entry, the debugger searches for a match with that address. If such a match is found, the breakpoint is processed by keeping control in the debugger; i.e., not returning control to the application process except to temporarily restore the original op code and step the program over it, and then restore the trap instruction. If such a match is not found, then the original instruction is replaced and stepped, the breakpoint trap is replaced, and execution of the application process is resumed.

Consider the same process from the perspective of debugging the source program of Table 8 in the manner of FIG. 11.

TABLE 8

```
1: class Object
2: {
3: public:
4:    virtual int f( ) { return a; }
5: protected:
6:    int a;
7: };
8:
9: class A: public Object
10: {
11: public:
12:    int f( );
13:    int g( );
14: };
15:
16: class B: public Object
17: {
18: public:
19:    int f( );
20:    int g( );
21: };
22:
23: int A::f( )
24: {
25:    return ++a;
26: }
27:
28: int B::f( )
29: {
30:    return --a;
31: }
32:
33: int A::g( )
34: {
35:    return 1;
36: }
37:
38: int B::g( )
39: {
40:    return 2;
41: }
42:
43: void
44: main( )
45: {
46:    Object *o2 = new A;
47:    A *aObject = new A;
48:    B *bObject = new B;
49:    o2->f( );
50:    aObject->f( );
51:    aObject->g( );
52:    bObject->g( );
53: }
```

Assume that the program has been compiled. A typical debugging session is given in Table 9.

TABLE 9

$ # start up a debugging session. The name of the

TABLE 9-continued

```
$ # debugger is sdb++; the name of the program
$ # file is a.out. The "*" character is the
$ # debugger prompt. Comments, both to the Shell command
$ # interpreter and to the debugger, start with the
$ # character "#"
$ #
$ sdb++ a.out
* # before the program even starts executing, arrange
* # to have it relinquish control to the debugger at
* # line 49b
* 49b    # stop before line 49 executes
main:49 b
* # The debugger responds that it set a breakpoint
* # in the function named main, at source line 49
*
* # Run program--the debugger will respond with
* # the name of the program file
* r
a.out
Breakpoint at
main:49:   o2 −> f( );
* # The debugger notifies us that the breakpoint
* # has occurred, and prints out the statement that
* # is about to be executed. At this point in the
* # program, the pointer o2 has been set up to point
* # to a valid object (See Table 8). Given that, we
* # can set a breakpoint on a function inside that
* # object. We specify that a breakpoint should fire
* # when the f( ) function is called with o2 as an operand.
* # The debugger acknowledges the request with the
* # fully qualified class and function name, and its
* # source line number. Note that even though o2
* # is declared as a pointer to an Object, it actually
* # points to an object of class A. That is important
* # if the function we are scrutinizing is virtual, as
* # the function f( ) is. In other words, the debugger
* # ends up getting the "right" f( ).
*o2−>f:b
A::f( ):25 b
* c    #continue execution from the current point
Breakpoint at
main::o2−>A::f( ):25:   return ++a;
* # The debugger has notified us that an Actors breakpoint
* # has occurred at line 25. Furthermore, it notes that
* # the breakpoint occurred inside the object pointed to
* # by the pointer o2, which is declared in function main.
* # Now we continue from that point.
* c
Process terminated
* # The debugger tells us that a.out is done, and we now
* # quit out of the debugger.
* q
$
```

Table 10 gives a debugging session where actors breakpoints are used, but where no virtual functions come into play.

TABLE 10

```
$ # start up the debugger
$ #
$ sdb++ a.out
* # set a breakpoint at line 49 of the source code
* # (this program has only one source file; were there
* # multiple files, the appropriate file or function
* # could have been selected)
* 49b
main:49 b.
* r    #start the program up
a.out
Breakpoint at
main:49:   o2−>f( );
* # at this point, aObject has been initialized to point
* # to an object of class A (Table 8). Set a breakpoint
* # on its g( ) operation. Since g( ) is not virtual,
* # the identity of the function comes from the type of
* # the object pointer, not from the actual type of the
* # object. In this case, aObject is declared as pointing
* # to an object of class A, so its g( ) operation will
* # be used. Were g( ) present only in class Object,
```

TABLE 10-continued

```
* # and were not present in class A at all, then the
* # breakpoint would fall on Object::g, since Object::g
* # would be inherited by class A.
* aObject—>g:b
A::g( ):35 b
* c       # continue execution
Breakpoint at
main:aObject—>A::g( ):35:   return 1;
* #
* # The breakpoint has fired; it tells us that it was an
* # Actors breakpoint (that it was inside main:aObject), and
* # gives us the line number, class, function name, and
* # source line. Now continue execution. Note that no
* # breakpoint occurs for the call at line 52 (Table 8),
* # since that is on a different object. (In fact, it is
* # also on a different class--class B--but even if bObject
* # were set up to point to an object of class A, the
* # breakpoint wouldn't fire--it's the wrong Actor!)
* c
Process terminated
* q
$
```

Table 11 gives a debugging session involving a non-Actors, non-virtual breakpoint that fires unconditionally.

TABLE 11

```
$ # start up the debugger
$ sdb++ a.out
* # plant a breakpoint at line 49
* 49b
main:49 b
* # start up the program
* r
a.out
Breakpoint at
main:49:   o2—>f( );
* # set a breakpoint for a particular function of a named
* # class, without regard to the object (operand) that
* # might be associated with it. All objects that are
* # operated on using function g( ) of class B will have
* # a breakpoint fire when that function is applied to them
* B::g:b
B::g:40 b
* c       # continue execution
Breakpoint at
B::g( ):40:   return 2;
* # The breakpoint has announced itself as being a non-Actors
* # breakpoint (no object name is present, just a class and
* # member function), along with the line number of the break-
* # point and the text that is found there. Continue execution from
* # there:
* c
Process terminated
* q
$
```

What has been discussed thus far is a debugging technique that applies to a language like C++, which uses inheritance to relate types to each other, and which uses virtual functions as a mechanism to look at an object at run time and select the right function for execution, from among the many functions of the same name that exist as operations on classes in an inheritance hierarchy; this is called inclusion polymorphism. Inclusion polymorphism is a subcategory of the broader classification of universal polymorphism. This is a common idiom for object-oriented programming.

However, there is another important idiom where the focus is on the functions first, and on types second. Consider a function sort, which takes as its sole parameter a vector of orderable items, which it will return in situ in sorted order. The function may work uniformly on a vector of objects of any type, and in fact the function may behave differently for each such type presented to it. All such types typically exhibit some common structure, a mirror-image of inheritance. This is called parametric polymorphism, because a type parameter for each parameter is explicitly or implicitly supplied to the function. Parametric polymorphism is also classified as a form of universal polymorphism.

The techniques described herein apply to both major categories of universal polymorphism; the inclusion polymorphic case has already been described. Reiterating briefly, assume there is a group of classes that implement graphical shapes, and that these classes are related in an inheritance hierarchy. The code of Table 12 illustrates the inclusion polymorphic approach and may be used to rotate any such shape.

TABLE 12

```
Shape *s;
...
s = new Rectangle;
...
s—>rotate(90.0);     // rotate 90 degrees; rotate is virtual
...
s = new Triangle;
...
s—>rotate(90.0);     // rotate 90 degrees
```

The code of Table 13 illustrates the analogous approach under parametric polymorphism.

TABLE 13

```
Rectangle s;
Triangle t;
...
rotate(s,90.0);    // rotate 90 degrees
...
rotate(t,90.0);    // rotate 90 degrees
```

As can be seen by comparing the two examples, the differences are mainly syntactic, and approaches directly analogous to the treatment of virtual functions in the inclusion polymorphism case apply to the parametric case. If a user desired to stop on the rotate operation on some triangle, the user would request that the debugger: stop at rotate(t . . . ), where the ellipses indicates that the values of ensuing arguments are to be ignored. The debugger inserts the breakpoint at the function rotate, and sets up its tables to associate that breakpoint with the object indicated by t at the time the breakpoint was inserted. Other than that, the functions used for parametric polymorphism are the same as described for inclusion polymorphism.

This approach is predicated on the assumptions that universal parametric polymorphism is being used in such a way that the identity of the primary operand is always identifiable, either by convention or by other support from the symbol table. In the above example, the first parameter is assumed to be the primary operand, with the types of subsequent operands being ignored.

It is to be understood that the above-described embodiments are merely illustrative of the principles of the invention and that many variations may be devised by those skilled in the art without departing from the spirit and scope of the invention. It is therefore intended that such variations be included within the scope of the claims.

We claim:

1. A method for use by a digital computer in controlling execution of an object-oriented program to effect a defined action when a specified virtual function is invoked on a specified object during execution of said program, said method comprising,
- initiating execution of said program,
- creating said specified object in accordance with execution of said program,
- after said creating, determining an address of a function that is called when said specified virtual function is invoked on said specified object, and
- inserting a breakpoint at said determined address of a function.

2. A method in accordance with claim 1 further comprising
- after said creating and before said determining, stopping execution at an intermediate point of said program,
- after said inserting, resuming execution of said program from said intermediate point,
- detecting a firing of said breakpoint,
- in response to detecting said firing, determining whether said firing occurred on said specified object, and
- in response to determining that said firing occurred on said specified object, performing said defined action.

3. A method in accordance with claim 2 further comprising
- after said resuming and before said detecting, invoking said specified virtual function on said specified object in accordance with execution of said program.

4. A method in accordance with claim 2 wherein said action is defined by default.

5. A method in accordance with claim 2 wherein said action comprises stopping execution of said program.

6. A method in accordance with claim 2 wherein said action is defined by a user as part of a request to effect said defined action when said specified virtual function is invoked on said specified object.

7. A method in accordance with claim 1 further comprising
- after said creating, selecting, in accordance with execution of said program and as a function of the class of said specified object, said function that is called when said specified virtual function is invoked on said specified object.

8. A method in accordance with claim 1 wherein said determining comprises
- obtaining an address of said specified object, said method further comprising
- after said creating and before said determining, stopping execution at an intermediate point of said program,
- storing an entry in a breakpoint table, said entry defining said determined address of a function and said obtained address of said specified object for said breakpoint,
- after inserting said breakpoint, resuming execution of said program from said intermediate point,
- detecting a firing of a breakpoint,
- in response to detecting said firing, ascertaining an address of said detected firing of a breakpoint and an address of a present object,
- when said ascertained address of said detected firing of a breakpoint and present object address respectively correspond to said determined address of a function and object address of said entry in said breakpoint table, performing said defined action.

9. A method in accordance with claim 1 wherein said determining comprises
- obtaining an address and base type of said specified object,
- using said obtained address and base type of said specified object, locating a virtual function table for said specified object and
- obtaining said determined address of a function as an address from said virtual function table that maps, via a predefined address to function mapping, into said specified virtual function.

10. A method in accordance with claim 1 further comprising before said initiating, compiling said program.

11. A method in accordance with claim 10 wherein said compiling comprises
- generating a symbol table for said program, said symbol table defining an address and a type for each of a plurality of variables of said program, one of said variables being a pointer to said specified object.

12. A method in accordance with claim 11 wherein said determining comprises
- determining from said symbol table an address and a type of said pointer variable,
- reading a contents of said determined address of said pointer variable to obtain an address of said specified object,
- using said determined type of said pointer variable and said obtained address of said specified object, locating a virtual function table for said specified object, said virtual function table containing addresses for virtual functions,
- obtaining said determined address of a function as an address from said virtual function table that maps, via a predefined address to function mapping, into said specified virtual function.

13. A method in accordance with claim 1 wherein said program is a C++ program.

14. A method for use by a digital computer in controlling execution of an object-oriented program, said method comprising
- compiling said program,
- after said compiling, initiating execution of said program,
- stopping execution at an intermediate point of said program,
- after stopping execution and in response to a request to effect a defined action when a specified virtual function is invoked on a specified object during execution of said program, determining an address of a function that is called when said specified virtual function is invoked on said specified object, and
- inserting a breakpoint at said determined function address.

15. A method in accordance with claim 14 further comprising
- after inserting said breakpoint, resuming execution of said program from said intermediate point,
- detecting a firing of said breakpoint,
- in response to detecting said firing, determining whether said firing occurred on said specified object, and
- in response to determining that said firing occurred on said specified object, performing said defined action.

16. A method for use by a digital computer in effecting a defined action when a specified function is invoked on a specified object during execution of an object-oriented program, said method comprising
- determining an address of a function that is called when said specified function is invoked on said specified object,
- inserting a breakpoint at said determined address of a function,
- obtaining an address of said specified object,
- storing an entry in a breakpoint table, said entry defining said determined address of a function and said obtained address of said specified object for said breakpoint,
- in response to detecting firing of a breakpoint, ascertaining an address of said detected firing of a breakpoint and an address of a present object and
- when the ascertained breakpoint address and present object address respectively correspond to the address of a function and object address of said entry in said breakpoint table, performing said defined action.

17. A method in accordance with claim 16 wherein said specified function is a non-virtual function and said determining comprises
- determining an address of said specified function.

18. A method in accordance with claim 16 wherein said specified function is a virtual function, said method further comprising the following steps performed prior to said determining:
- compiling said program,
- after said compiling, initiating execution of said program and
- stopping execution at an intermediate point of said program after creation of said specified object.

19. A method in accordance with claim 16 wherein said specified function is any one of a plurality of functions of said program including both virtual functions and non-virtual functions.

20. A method for use by a digital computer in controlling execution of an object-oriented program to effect a defined action when a specified function is invoked with a specified argument during execution of said program, said method comprising
- initiating execution of said program,
- creating an object in accordance with execution of said program,
- after said creating, determining an address of a function that is called when said specified function is invoked with said specified argument and said specified argument is associated with said object, and
- inserting a breakpoint at said determined address of a function.

21. A method in accordance with claim 20 further comprising
- after said creating and before said determining, stopping execution at an intermediate point of said program,
- after said inserting, resuming execution of said program from said intermediate point,
- detecting a firing of said breakpoint,
- in response to detecting said firing, determining whether said firing occurred on said object, and
- in response to determining that said firing occurred on said object, performing said defined action.

* * * * *